United States Patent [19]

Ishikawa

[11] Patent Number: 5,102,163

[45] Date of Patent: Apr. 7, 1992

[54] IMPACT ENERGY ABSORBING STRUCTURE FOR A VEHICLE

[75] Inventor: Toshihiro Ishikawa, Hiroshima, Japan

[73] Assignee: Mazda Motor Corporation, Hiroshima, Japan

[21] Appl. No.: 543,584

[22] Filed: Jun. 26, 1990

[30] Foreign Application Priority Data

| Jun. 27, 1989 | [JP] | Japan | 1-74400[U] |
| Sep. 20, 1989 | [JP] | Japan | 1-110471[U] |
| Sep. 20, 1989 | [JP] | Japan | 1-110472[U] |

[51] Int. Cl.⁵ .............................. B60J 5/00; B60R 21/04
[52] U.S. Cl. ...................................... 280/751; 296/146; 296/188
[58] Field of Search ............... 280/751, 777; 296/153, 296/152, 189, 188, 146; 293/109, 136; 188/377

[56] References Cited

U.S. PATENT DOCUMENTS

| 3,610,609 | 10/1971 | Sobel | 188/377 |
| 3,721,433 | 3/1973 | Sobel | 188/377 |
| 3,779,595 | 12/1973 | Suzuki | 280/748 |
| 3,930,665 | 1/1976 | Ikawa | 188/377 |
| 3,984,128 | 10/1976 | Oehm | 280/751 |
| 3,989,275 | 11/1976 | Finch | 280/751 |
| 4,098,525 | 7/1978 | Schwanz | 280/751 |
| 4,786,100 | 11/1988 | Kleemann | 296/153 |
| 4,901,500 | 2/1990 | Wycech | 296/146 |
| 4,917,433 | 4/1990 | Tomforde | 296/188 |

FOREIGN PATENT DOCUMENTS

| 3026736 | 2/1982 | Fed. Rep. of Germany | 296/189 |
| 56-47319 | 4/1981 | Japan | 296/153 |
| 1189810 | 4/1970 | United Kingdom | 296/153 |

*Primary Examiner*—Charles A. Marmor
*Assistant Examiner*—Karin Tyson
*Attorney, Agent, or Firm*—Wenderoth, Lind & Ponack

[57] ABSTRACT

An impact energy absorbing structure for a vehicle includes impact energy absorbing devices attached to a side wall of the passenger compartment of the vehicle to absorb impact energy resulting from a lateral collision and tending to act laterally on an occupant of the vehicle. The impact energy absorbing devices include a chest protecting shock absorbing unit disposed opposite to an occupant's chest and having a shock absorbing pad protruding from the side wall of the passenger compartment toward the interior of the passenger compartment, and a lumbar region protecting shock absorbing unit disposed opposite to an occupant's lumbar region and having a shock absorbing pad protruding from the side wall of the passenger compartment toward the interior of the passenger compartment. Rigidity enhancing elements cover the shock absorbing pads so as to enhance the rigidity of only the side surfaces of the shock absorbing pads facing the interior of the passenger compartment. The rigidity of the lumbar region protecting shock absorbing unit is greater than that of the chest protecting shock absorbing unit. The speed of collision of the chest protecting shock absorbing unit against the occupant's chest is lower than that of the lumbar region protecting shock absorbing unit against the occupant's lumbar region. The impact energy absorbing structure reduces the effect of shocks acting on the occupant upon a lateral collision of the vehicle against an obstacle. The impact energy absorbing devices are not suscepticle to being permanently dented and the like, even if the occupant applies a small impact force thereto, and absorb impact energy effectively in event of a lateral collision.

30 Claims, 9 Drawing Sheets

IMPACT ENERGY ABSORBING STRUCTURE FOR A VEHICLE

BACKGROUND OF THE INVENTION

1. Field of the Invention

The present invention relates to an impact energy absorbing structure for a vehicle and, more particularly, to an impact energy absorbing structure capable of absorbing impact energy to reduce shocks that act on a passenger in the case of a lateral collision of the vehicle with an obstacle, and having shock absorbing means incorporated into an inner panel of a side door of a body of an automotive vehicle, capable of preventing the production of flaws, such as permanent dents, by light pressure applied thereto by the passenger and capable of exerting sufficient impact energy absorbing ability in the case of a lateral collision.

2. Description of the Prior Art

Japanese Utility Model Laid-open (Kokai) No. 61-171620 discloses a side door having an inner panel provided with shock absorbing pads to protect the passenger from injury in case of a lateral collision of the vehicle with another vehicle. The shock absorbing pads absorb lateral impact energy applied to the body of the vehicle so that the passenger will be subjected to reduce impact energy. The shock absorbing pads include a chest protecting pad and a lumbar protecting pad that are substantially the same in rigidity and in thickness, i.e. the size with respect to the width of the body of the vehicle. FIG. 1 shows a basic construction of conventional impact energy absorbing structure, which is constructed by attaching a shock absorbing pad 3, such as a urethane foam pad, to a door inner panel 2 attached to a side door 1.

The basic construction shown in FIG. 1 is practiced in the form of the following specific structures. In an impact energy absorbing structure shown in FIG. 2, the shock absorbing pad 3 is coated with a sponge sheet 4, and the sponge sheet 4 is coated with a hard skin 5. In an impact energy absorbing structure shown in FIG. 3, the shock absorbing pad 3 is covered entirely with a cover 6 formed of a material having a high degree of rigidity, such as a hard plastic plate.

The impact energy absorbing structure of the basic construction shown in FIG. 1 has a disadvantage that a permanent dent 8 or the like is liable to be formed in the shock absorbing pad 3 by pressure applied thereto by the finger or body of the passenger or by luggage. In the impact energy absorbing structure shown in FIG. 2, the same pressure forms a somewhat smaller dent in the shock absorbing pad 3 and the dent may be concealed under the sponge sheet 4, however, the dent remains permanently in the shock absorbing pad 3. Such impact energy absorbing structures susceptible to damage are inferior in commercial value and hence unsatisfactory.

The impact energy absorbing structure shown in FIG. 3 does not allow a dent 8 to be formed in the shock absorbing pad 3. However, the protective function and the shock resistance of the rigid cover 6 protecting the shock absorbing pad 3 spoils the energy absorbing function of the shock absorbing pad 3 and, consequently, the shock absorbing pad 3 is incapable of effectively performing the shock absorbing function.

To eliminate such disadvantages in the foregoing known impact energy absorbing structures, Japanese Utility Model Laid-open (Kokai) No. 58-118082 proposes an improved impact energy absorbing structure as shown in FIG. 4. This improved impact energy absorbing structure employs a rigid cover 6 provided with grooves 9 to reduce the rigidity of the cover to some extent. However, the grooves 9 form a rugged surface spoiling the appearance and touch of the cover 6. Furthermore, the grooves 9 require additional work for forming the cover and the operation of attaching the shock absorbing pad 3 to the cover 6 difficult, and increases costs.

The protective function of an impact energy absorbing structure as shown in FIG. 5 and having a door inner panel provided with a chest protecting pad 3a and a lumbar protecting pad 3b will be examined.

Suppose that the passenger 10 has a head 10a of a mass m1, a chest 10b of a mass m2 and a rigidity (spring constant) $k_2$, and a lumbar region 10c of a mass m and a rigidity $k_3$. Generally, the lumbar region 10c has a higher rigidity and resistance than chest 10b, and hence $k_3 > k_2$.

Suppose that the same impact force F acts on both the chest 10b and lumbar region 10c of the passenger 10. Since the head 10a is supported on the chest 10b, the virtual mass of the chest 10b is $m_2 + m_2$. Since the head 10a and the chest 10b are supported on the lumbar region 10c, the virtual mass of the lumbar region 10c is $m + _1m_2 + m_3$. Then, according to Newton's laws of motion, $$F = (m_1 + m_2) \cdot a_2 = (m_1 + m_2 + m_3) \cdot a_3$$

where $_2$ is the lateral acceleration of the chest 10b, and $_3$ is the lateral acceleration of the lumbar region 10c. Under such a condition, $$F = k_2 \cdot x_2 = k_3 \cdot k_3$$

where $x_2$ and $x_3$ are the respective lateral displacements of the chest 10b and the lumbar region 10c.

Thus, $Ca_2 > a >_3$ and $x_2 > k_3$ when the same impact force F acts on both the chest 10b and lumbar region 10c of the passenger 10. Therefore, it is estimated that the effect of the collision of the vehicle with another vehicle is higher on the chest 10b of the passenger 10 than on the lumbar region 10c of the passenger 10.

In view of the foregoing fact, when the chest protecting pad 3a and the lumbar protecting pad 3b are the same in rigidity, the chest protecting pad 3a is excessively hard while the lumbar protecting pad 3b is excessively soft. Such an impact energy absorbing structure is unsatisfactory because the comparatively weak chest 10b of the passenger 10 is exposed to the danger of greater shocks.

The chest protecting pad 3a and the lumbar protecting pad 3b of the conventional impact energy absorbing structure are substantially the same in thickness, so that the chest protecting pad 3a and the lumbar protecting pad 3b strike substantially simultaneously against the chest 10b and the lumbar region 10c, respectively, when impact energy is imparted to the impact energy absorbing structure. As mentioned above, the rigidity of the skeletal construction and the resistance to shocks of the lumbar region are greater than those of the chest 10c.

In view of such facts, the chest 10b and lumbar region 10c of the passenger 10 will strike substantially simultaneously against the chest protecting pad 3a and the lumbar protecting pad 3b, respectively, and the chest 10b having a rigidity and resistance against shocks lower than those of the lumber region 10c may be exposed more seriously to the effect of shocks. Therefore, the impact energy absorbing structure shown in FIG. 5, as well as those shown in FIGS. 1 to 4, are not satisfactory.

SUMMARY OF THE INVENTION

The present invention has been made in view of the foregoing problems in the conventional impact energy absorbing structures.

Accordingly, it is a first object of the present invention to provide an impact energy absorbing structure for a vehicle, employing shock absorbing means that are not susceptible to the action of light external forces tending to produce flaws such as dents therein and that are capable of effectively absorbing impact energy that acts thereon in case of a collision.

It is a second object of the present invention to provide an impact energy absorbing structure for a vehicle, capable of reducing impact energy applied to both of an occupant's chest and lumbar region and capable of reducing the effect of shocks particularly to the occupant's chest.

To achieve such objects of the invention, in a first aspect of the present invention, an impact energy absorbing structure for a vehicle comprises impact energy absorbing means attached to a side wall of a passenger compartment of the vehicle to absorb impact energy resulting from a lateral collision and tending to act laterally on the occupant. The impact energy absorbing means comprises shock absorbing pads protruding toward the interior of the passenger compartment from the side wall to absorb the impact energy, and rigidity enhancing means covering the shock absorbing pads so that the rigidities of only the side surfaces of the shock absorbing pads are enhanced.

When a comparatively small shock is applied to the impact energy absorbing means, the rigidity enhancing means is sufficiently resistant to the resultant comparatively small impact force to bear the shock and to prevent the production of permanent flaws in the shock absorbing pads. When the occupant is forced to move laterally in the passenger compartment and to collide against the striking energy absorbing means applying a large impact force in event of a lateral collision, the resultant large impact force acts through the rigidity enhancing means on the shock absorbing pads, and then the shock absorbing pads collapse on the side wall to absorb the impact energy. On the other hand, the rigidity enhancing means is pressed toward the side wall without being broken while supporting the occupant, so that the occupant is protected from injury.

The rigidity enhancing means bears a comparatively small impact force to protect the shock absorbing pads, and the shock absorbing pads collapse under a large impact force to absorb the impact energy. The shock absorbing pads are formed of polyurethane.

The rigidity enhancing means covers only the side surfaces of the shock absorbing pads facing the interior of the compartment. The rigidity enhancing means is formed of a hard synthetic resin in the shape of a cup.

In a modification, the rigidity enhancing means is formed of a hard synthetic resin so as to cover the shock absorbing pads entirely. The thickness of the side walls, covering the side surfaces of the shock absorbing pads, of the rigidity enhancing means is greater than that of the circumferential walls, covering the circumferential surfaces of the shock absorbing pads, of the rigidity enhancing means. The thickness of the circumferential walls decreases gradually from portions near the side walls to their edges adjacent the side wall of the compartment. The circumferential walls of the rigidity enhancing means are inclined at an inclination to the side wall of the passenger compartment. The surface of the rigidity enhancing means is covered with a soft, elastic material, such as sponge.

The impact energy absorbing means comprises a chest protecting shock absorbing unit attached to the side wall of the passenger compartment at a position corresponding to an occupant's chest, and a lumbar region protecting shock absorbing unit attached to the side wall of the passenger compartment at a position corresponding to the occupant's lumbar region. The chest protecting shock absorbing unit and the lumbar region protecting shock absorbing unit are vertically spaced apart from each other.

The impact energy absorbing means incorporates rigidity enhancing means providing that the rigidity of the lumbar region protecting shock absorbing unit is greater than that of the chest protecting shock absorbing unit. The rigidity enhancing means forms a shock absorbing pad included in the lumbar region protecting shock absorbing unit of a material of a composition different from that of a material forming a shock absorbing pad included in the chest protecting shock absorbing unit and of a rigidity greater than that of the material forming the shock absorbing pad included in the chest protecting unit.

The impact energy absorbing means incorporates collision speed reducing means for ensuring that, in the event of a collision, the speed of collision of the occupant's chest against the chest protecting shock absorbing unit is lower than that of the occupant's lumbar region against the lumbar region protecting shock absorbing unit. The collision speed reducing means ensures that the occupant's lumbar region will collide against the lumbar region protecting shock absorbing unit before the occupant's chest collides against the chest protecting shock absorbing unit. The collision speed reducing means is provided by an arrangement that the lumbar region protecting shock absorbing unit protrudes into the passenger compartment by a height or distance greater than that of the chest protecting shock absorbing unit. The collision speed reducing means also is provided by the thickness of the shock absorbing pad of the lumbar region protecting shock absorbing unit being greater than that of the shock absorbing pad of the chest protecting shock absorbing unit.

The rigidity enhancing means may be formed so as to cover the shock absorbing pads entirely. The thickness of the side walls of the rigidity enhancing means covering the side surfaces of the shock absorbing pads is greater that that of the circumferential walls of the rigidity enhancing means covering the circumferential surfaces of the shock absorbing pads. The thickness of the circumferential walls decreases gradually from portions thereof near the side walls thereof to their edges adjacent the side wall of the passenger compartment. The circumferential walls of the rigidity enhancing means may be inclined at an inclination to the side wall of the passenger compartment. A reinforcing member and/or a reinforcing bar may be provided on the side wall of the passenger compartment at a position corresponding to lumbar region protecting shock absorbing unit.

The side wall of the passenger compartment is a door inner panel forming an inner wall surface of the passenger compartment. The impact energy absorbing means is incorporated into a trim member attached to the door inner panel. The trim member comprises a board or panel for covering the inner surface of the door inner panel and for supporting the impact energy absorbing means, and a covering member for entirely covering the board or panel and the impact energy absorbing members. The trim member supporting the impact energy absorbing means may be attached to the door inner panel. The rigidity enhancing means may be a smooth surface.

In a second aspect of the present invention, an impact energy absorbing structure comprises impact energy absorbing means for absorbing impact energy resulting from a lateral collision and tending to act laterally on an occupant. The impact energy absorbing means comprises a chest protecting shock absorbing unit disposed at a position corresponding to the occupant's chest, a lumbar region protecting shock absorbing unit disposed at a position corresponding to the occupant's lumbar region, and rigidity enhancing means for providing that the rigidity of the lumbar region protecting shock absorbing unit is greater than that of the chest protecting shock absorbing unit.

Since the rigidity of the lumbar region protecting shock absorbing unit is greater than that of the chest protecting shock absorbing unit, the chest protecting shock absorbing unit and the lumbar region protecting shock absorbing unit may be provided with different rigidities respectively appropriate for effectively reducing the effect of a collision on the occupant.

The chest protecting shock absorbing unit and the lumbar region protecting shock absorbing unit include respective shock absorbing pads for absorbing impact energy. The shock absorbing pads protrude from the side wall of the passenger compartment toward the interior of the passenger compartment. Rigidity enhancing means for ensuring that the rigidity of the lumbar region protecting shock absorbing unit is greater than that of the chest protecting shock absorbing unit may be provided by forming the shock absorbing pad of the lumbar region protecting shock absorbing unit of a material having a quality and composition different from that of material forming the shock absorbing pad of the chest protecting shock absorbing unit.

The rigidity enhancing means providing that the rigidity of the lumbar region protecting shock absorbing unit is greater than that of the chest protecting shock absorbing unit may be a hard synthetic resin member covering the shock absorbing pad of the lumbar region protecting shock absorbing unit.

A lumbar region protecting shock absorbing unit also may serve as a door pocket. The lumbar region protecting shock absorbing unit serving also as the door pocket may be formed of a highly rigid, hollow member having an upper opening and attached to the side wall of the passenger compartment.

In a third aspect of the present invention, an impact energy absorbing structure comprises impact energy absorbing means attached to a side wall of the passenger compartment to absorb impact energy resulting from a lateral collision and tending to act laterally on the occupant. The impact energy absorbing means comprises a chest protecting shock absorbing unit disposed at a position corresponding to the occupant's chest, a lumbar region protecting shock absorbing unit disposed at a position corresponding to the occupant's lumbar region, and collision speed reducing means for ensuring that the speed of collision of the occupant's chest, in the event of a collision, against the chest protecting shock absorbing unit is less than that of the occupant's lumbar region against the lumbar region protecting shock absorbing unit.

The chest protecting shock absorbing unit and the lumbar region protecting shock absorbing unit comprise respective shock absorbing pads attached to the side wall of the passenger compartment to absorb the impact energy. The collision speed reducing means ensures that the occupant's lumbar region will collide against the lumbar region protecting shock absorbing unit before the occupant's chest collides against the chest protecting shock absorbing unit. The collision speed reducing means may be formed by providing that the lumbar region protecting shock absorbing unit projects from the side wall of the passenger compartment by a height or distance greater than that of the chest protecting shock absorbing unit projecting from the side wall of the passenger compartment. The collision speed reducing means may be formed by the shock absorbing pad of the lumbar region protecting shock absorbing being of a thickness greater than that of the shock absorbing pad of the chest protecting shock absorbing unit.

The occupant's lumbar region collides against the lumbar region protecting shock absorbing unit before the occupant's chest collides against the chest protecting shock absorbing unit, so that the effect of the collision against the occupant's chest is reduced.

In a fourth aspect of the present invention, an impact energy absorbing structure comprises impact energy absorbing means attached to a side wall of the passenger compartment of the vehicle to absorb impact energy resulting from a lateral collision and tending to act laterally on the occupant. The impact energy absorbing means comprises a chest protecting shock absorbing unit having a shock absorbing pad projecting from the side wall toward the interior of the passenger compartment and disposed at a position corresponding to the occupant's chest, a lumbar region protecting shock absorbing unit having a shock absorbing pad projecting from the side wall toward the interior of the passenger compartment and disposed at a position corresponding to the occupant's lumbar region, rigidity enhancing means for covering the shock absorbing pads so as to increase the rigidity of only the side surfaces of the shock absorbing pads facing the interior of the compartment, means for ensuring that the rigidity of the lumbar region protecting shock absorbing unit is greater than that of the chest protecting shock absorbing unit, and collision speed reducing means for ensuring that, in the event of a collision, the speed of collision of the occupant's chest against the chest protecting shock absorbing unit will be lower than that of the occupant's lumbar region against the lumbar region protecting shock absorbing unit.

DETAILED DESCRIPTION OF THE PREFERRED EMBODIMENTS

Figure 1:
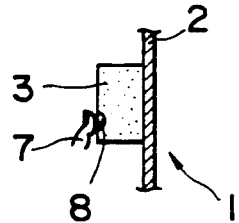
FIGS. 1 to 4 are sectional views of conventional shock absorbing pads.
Figure 2:
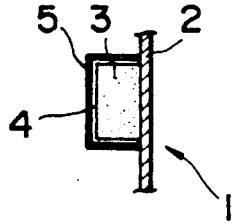
Figure 3:
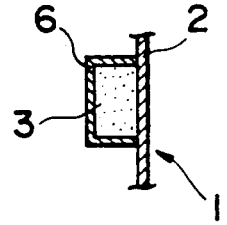
Figure 4:
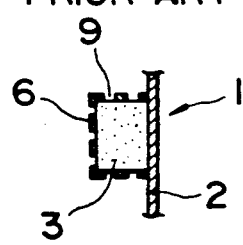
Figure 5:
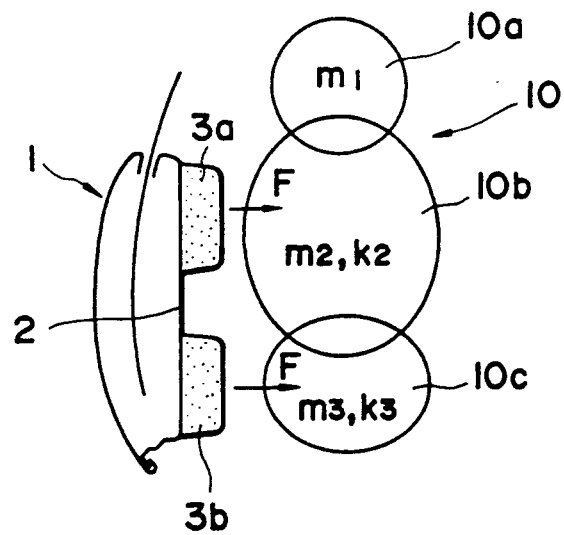
FIG. 5 is an illustration of assistance in explaining shocks that act on a passenger upon a lateral collision of a vehicle with an obstacle.
Figure 6:
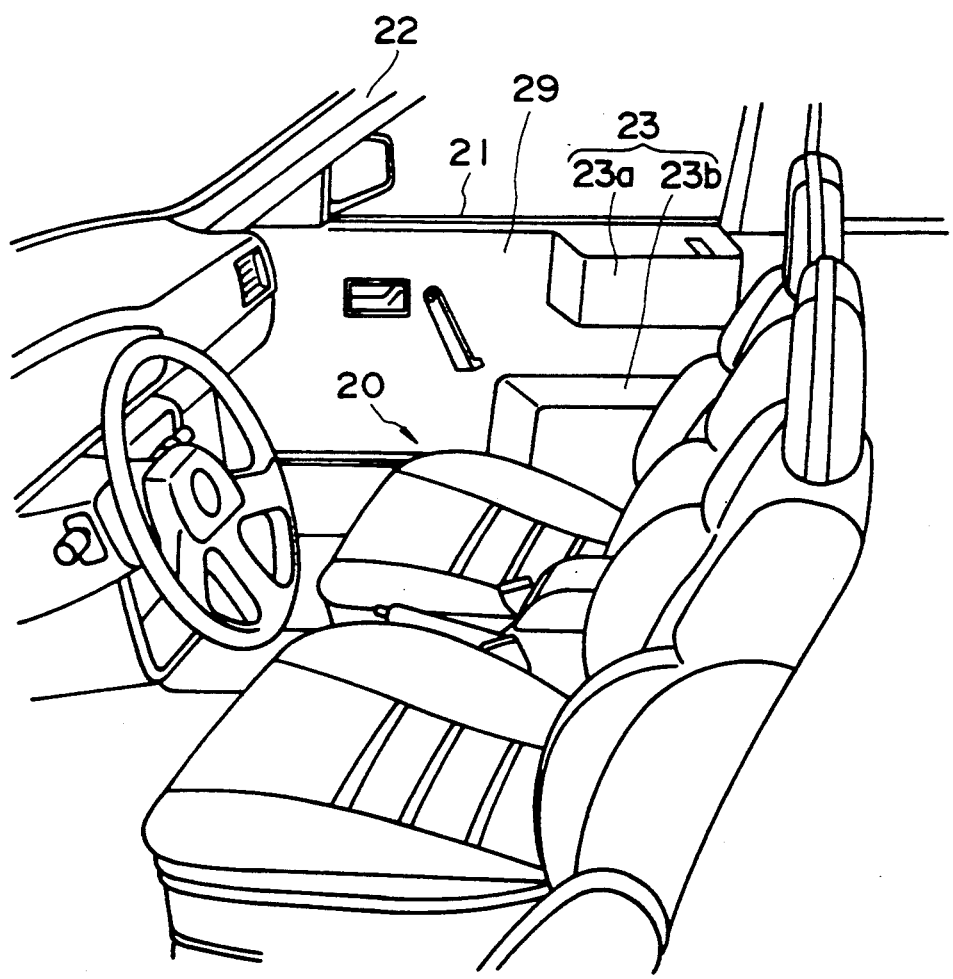
FIG. 6 is a perspective view of the interior of a passenger compartment of a vehicle incorporating the present invention.

Referring to FIG. 6, a side door 21 is hinged to a body 22 of a vehicle beside a passenger seat 20 of the vehicle. A shock absorbing unit 23 is provided on the inner surface of the side door 21. The shock absorbing unit 23 includes a chest protecting shock absorbing pad 23a disposed at a position corresponding to the passenger's chest and a lumbar region protecting shock absorbing pad 23b disposed under the chest protecting shock absorbing pad 23a at a position corresponding to the passenger's lumbar region. The shock absorbing unit 23 absorbs impact energy tending to act laterally on the passenger upon a lateral collision of the vehicle with another vehicle, and so on.

Figure 7:
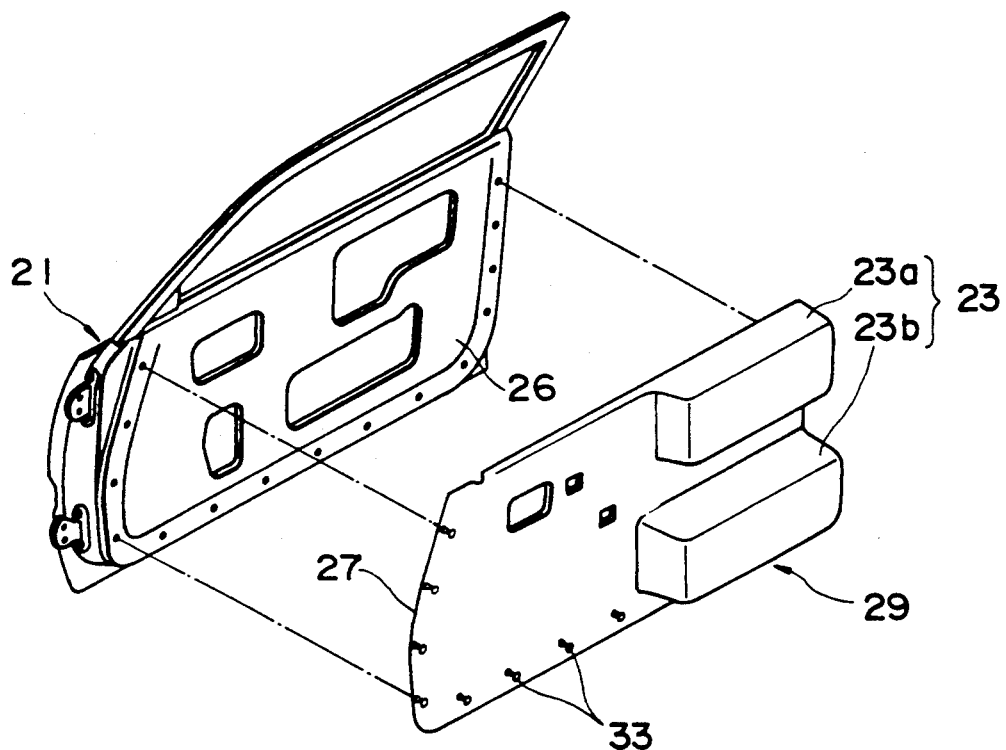
FIG. 7 is an exploded perspective view of assistance in explaining a manner of assembling an interior finishing unit incorporating the present invention and a door inner panel.
Figure 8:
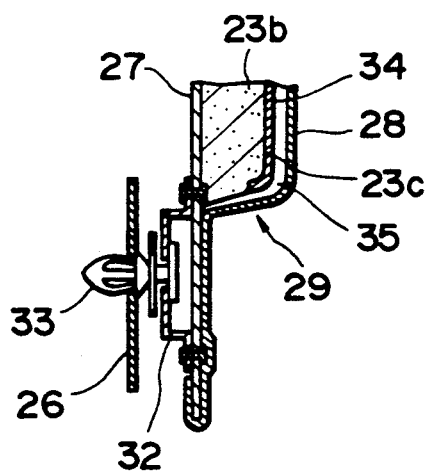
FIG. 8 is an enlarged fragmentary sectional view of the assembly of an interior finishing unit incorporating the present invention and a door inner panel.
Figure 9:
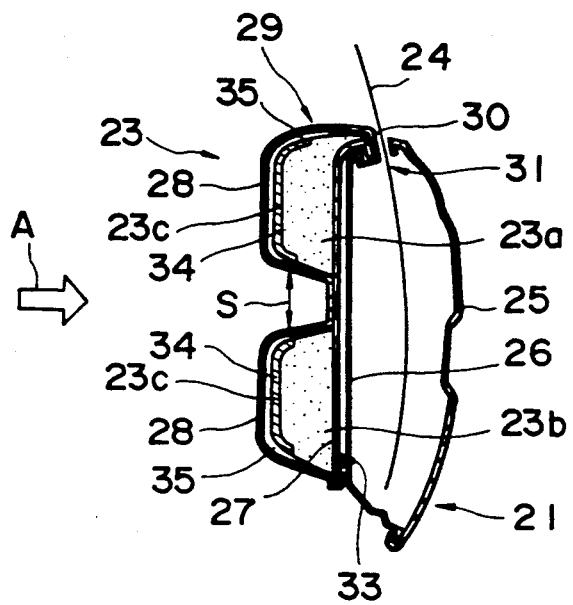
FIG. 9 is a sectional view of an impact energy absorbing structure of a first embodiment according to the present invention.

First Embodiment (FIGS. 7, 8 and 9)

Referring to FIGS. 7, 8 and 9, a shock absorbing unit 23 is provided on the inner surface of a side door 21 facing the interior of the passenger compartment of a vehicle. The side door 21 is formed by assembling a door outer panel 25 and a door inner panel 26. The shock absorbing unit 23 includes a chest protecting shock absorbing pad 23a and a lumbar region protecting shock absorbing pad 23b. A trim board or panel 29 is formed by attaching the chest protecting shock absorbing pad 23a and the lumbar region protecting shock absorbing pad 23b to a board or panel 27, i.e. a molded wood chip board, and covering the board 27, the chest protection shock absorbing pad 23a and the lumbar region protecting shock absorbing pad 23b with a vinyl leather sheet 28. The trim board 29 is attached to the inner side of the door inner panel 26, so that the chest protecting shock absorbing pad 23a and the lumbar region protecting shock absorbing pad 23b are disposed properly. The shock absorbing pads 23a and 23b are formed of hard polyurethane. The shock absorbing pad 23a and the shock absorbing pad 23b are disposed so as to correspond respectively to the chest and lumbar region of the passenger and to be vertically separated from each other by an interval S.

The upper edge of the trim board 29 is bent to form an upper bend 30. The trim board 29 is attached to the door inner panel 26 by hooking the upper bend 30 to an upper edge 31 of the door inner panel 26 and fastening the front, rear and lower sides of the trim board 29 to the door inner panel 26 with a plurality of fasteners 33 attached to fixtures 32.

Hard members 34 formed of a material having a comparatively high rigidity, such as a plastic, and respectively having shapes substantially resembling cups are attached to the vertical inner surfaces of the shock absorbing pads 23a and 23b facing the interior of the passenger compartment opposite to the driver. The upper and lower edges of the hard members 34 are rounded slightly. The hard member 34 may have the shape of a flat plate or a channel. The hard members 34 and the shock absorbing pads 23a and 23b are covered with a sponge layer 35 and the sponge layer 35 is covered with the vinyl leather sheet 28.

The hard members 34 withstand a comparatively small impact force applied to the shock absorbing pad unit 23 in the direction of an arrow A (FIG. 9) to prevent flawing the shock absorbing pads 23a and 23b of the shock absorbing unit 23 with permanent dents or the like.

When a comparatively large impact force is applied in the direction of the arrow A to the shock absorbing unit 23 by the passenger or the like, such as luggage, forced to move laterally toward the side door 21 by a lateral collision of the vehicle, the comparatively large impact force is transmitted through the hard members 34 to the shock absorbing pads 23a and 23b, and then the shock absorbing pads 23a and 23b collapse on the side door 21 to absorb the energy of such impact force. The hard members 34 are forced to move toward the side door 21 without being broken to support the passenger or the like, such as luggage. Accordingly, the passenger will not be injured and the luggage will not be damaged by deformed or broken hard members 34. The soft, flexible sponge layer 35 further ensures the safety of the passenger or the luggage.

Figure 10:
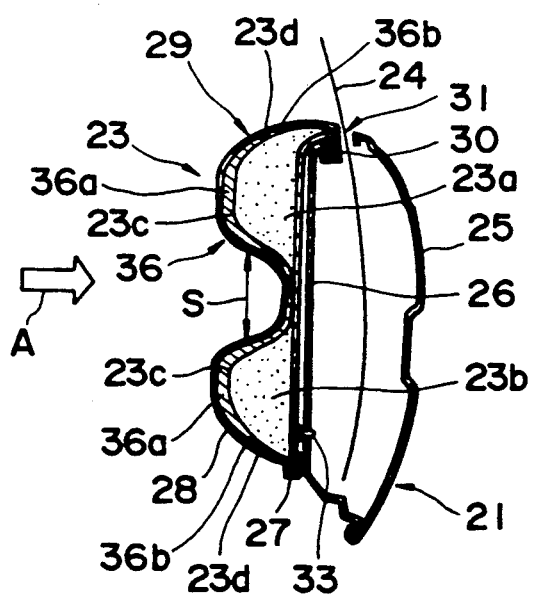
FIG. 10 is a sectional view of an impact energy absorbing structure of a second embodiment according to the present invention.

Second Embodiment (FIG. 10)

An impact energy absorbing structure of a second embodiment according to the present invention comprises a shock absorbing unit 23 comprising a chest protecting shock absorbing pad 23a and a lumbar region protecting shock absorbing pad 23b and having a construction substantially the same as that of the shock absorbing unit 23 of the first embodiment shown in FIGS. 6 to 9. The shock absorbing unit 23 is provided on a trim board or panel 29 attached to the door inner panel 26 of the side door of a vehicle.

In the second embodiment, the shock absorbing unit 23 is covered entirely with a molded cover member 36 formed integrally of a plastic material. The thickness of side walls 36a of the cover member 36 corresponding to the vertical side surfaces 23c of the shock absorbing pads 23a and 23b facing the compartment is greater than that of circumferential walls 36b, namely, walls corresponding to the upper, lower, front and rear surfaces of the shock absorbing pads 23a and 23b. The thickness of the circumferential walls 36b is decreased gradually from portions near the side walls 36a to their edges adjacent the door inner panel 26.

Thus, the side walls 36a have a comparatively high rigidity while the circumferential walls 36b have a comparatively low rigidity. When a force is applied to the side walls 36a, the circumferential walls 36b collapse.

The side walls 36a of the cover member 36 withstand a comparatively small impact force applied to the cover member 36 in the direction of the arrow A.

When a comparatively large impact force is applied to the cover member 36 in the direction of the arrow A, the circumferential walls 36b are readily deformed and the shock absorbing pads 23a and 23b collapse on the side door 21 to absorb high impact energy effectively, while the side walls 36a are translated toward the side door 21 while supporting the passenger or luggage. Thus, the impact energy absorbing structure, in a manner similar to that of the first embodiment, protects the passenger from being injured or protects the luggage from being damaged.

Figure 11:
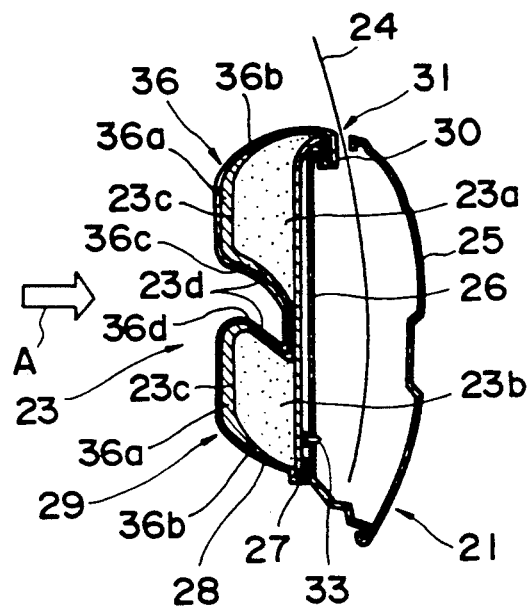
FIG. 11 is a sectional view of an impact energy absorbing structure of a third embodiment according to the present invention.

Third Embodiment (FIG. 11)

An impact energy absorbing structure of a third embodiment according to the present invention is analogous to the impact energy absorbing structure of the second embodiment in construction. Basically, a shock absorbing unit 23 comprising a chest protecting shock absorbing pad 23a and a lumbar region protecting shock absorbing pad 23b and provided on a trim board or panel 29 attached to the door inner panel 26 of a vehicle is similar in construction to the impact energy absorbing structure of the first embodiment shown in FIGS. 6 to 9.

As shown in FIG. 11, a cover member 36 employed in the third embodiment is formed in a shape that enables the cover member 36 to be readily deformed.

Referring to FIG. 11, lower wall 36c among the circumferential walls 36b of the cover member 36 and an upper wall 36d among the circumferential walls 36b of the cover member 36 are inclined at the same inclination to the door inner panel 26 so as to extend substantially parallel to each other. The direction of inclination is optional. The cover member 36 has a shape that collapses readily when a large impact force acts on the cover member 36 in the direction of the arrow A.

The damage preventing function and impact energy absorbing function of the impact energy absorbing structure are substantially the same as those of the impact energy absorbing structure of the second embodiment. The inclined lower wall 36c and inclined upper wall 36d of the cover member 36 enable smooth and effective impact energy absorption. Since the side surfaces 36a of the cover member 36 support the passenger or luggage, the passenger is protected from injury and the luggage is protected from damage.

Although the cover members 36 employed in the foregoing embodiments are formed integrally by molding, the cover member 36 may be formed by assembling side walls 36a and circumferential walls 36b by welding or other methods.

The smooth surfaces of the hard member 34 and the cover member 36 provide satisfactory appearance and touch to the impact energy absorbing structure.

Although the impact energy absorbing structure is exposed to frequent impulsive action by the passenger's fingers or by luggage, permanent flaws, such as small dents, are not formed in the side surfaces 23c of the shock absorbing pads 23a and 23b of the shock absorbing unit 23 because the side surfaces 23c of the shock absorbing pads 23a and 23b are covered with the comparatively highly rigid side walls 36a of the cover member 36. Covered with the comparatively less rigid circumferential walls 36b of the cover member 36, the circumferential surfaces 23d of the shock absorbing pads 23a and 23b have comparatively low rigidity. Hence the shock absorbing pads 23a and 23b of the shock absorbing unit 23 collapse readily to absorb large impact energy when a high impact force acts on the impact energy absorbing structure. Thus, the passenger is protected from injury and the luggage is protected from damage.

Figure 12:
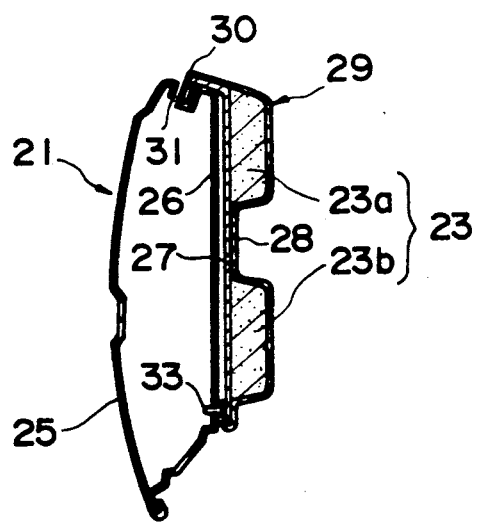
FIG. 12 is a sectional view of an impact energy absorbing structure of a fourth embodiment according to the present invention.

Fourth Embodiment (FIG. 12)

Basically a shock absorbing unit 23 employed in an impact energy absorbing structure of a fourth embodiment according to the present invention is the same in construction as the shock absorbing unit 23 shown in FIGS. 6 to 9.

The shock absorbing unit 23 comprises a chest protecting shock absorbing pad 23a and a lumbar region protecting shock absorbing pad 23b. The rigidity of the lumbar region protecting shock absorbing unit 23b is greater than that of the chest protecting shock absorbing unit 23a. The respective rigidities of the shock absorbing pads 23a and 23b are adjusted to desired different values by forming the shock absorbing pads 23a and 23b of materials differing from each other in expansion ratio and composition. The shock absorbing pads 23a and 23b are foam polyurethane blocks.

Figure 13:
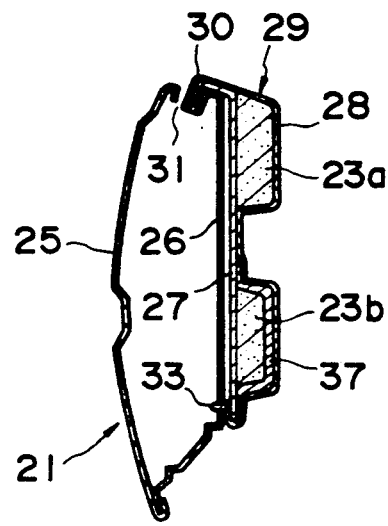
FIG. 13 is a sectional view of an impact energy absorbing structure of a fifth embodiment according to the present invention.

Fifth Embodiment (FIG. 13)

An impact energy absorbing structure of a fifth embodiment shown in FIG. 13 is analogous to the impact energy absorbing structure of the fourth embodiment.

In the fourth embodiment, the shock absorbing pads 23a and 23b are coated simply with a vinyl leather sheet 28, and the shock absorbing pads 23a and 23b are provided with respective different rigidities by adjusting the expansion ratio and the composition of the materials. On the other hand, in the fifth embodiment, the chest protecting shock absorbing pad 23a and lumbar region protecting shock absorbing pad 23b of the shock absorbing unit 23 are formed of the same material. However, the chest protecting shock absorbing pad 23a is coated only with a vinyl leather sheet 28, and the lumbar region protecting shock absorbing pad 23b is entirely covered with a comparatively rigid hard member 37 formed of a synthetic resin or the like, which is similar to the hard member employed in the first embodiment, and the hard member 37 is coated with the vinyl leather sheet 28. Thus, the rigidity of the lumbar region protecting shock absorbing pad 23b is greater than that of the chest protecting shock absorbing pad 23a.

Figure 14:
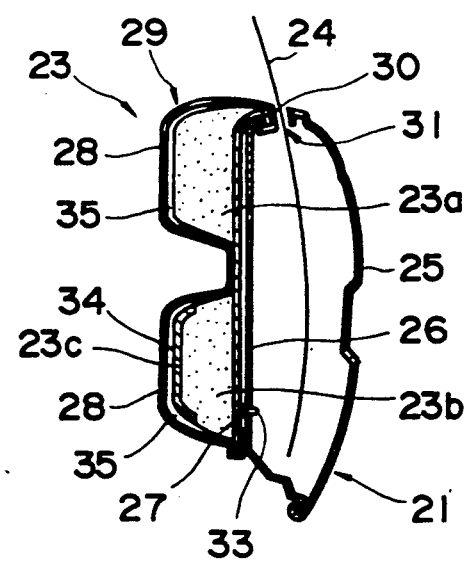
FIG. 14 is a sectional view of an impact energy absorbing structure of a sixth embodiment according to the present invention.

Six Embodiment (FIG. 14)

Figure 15:
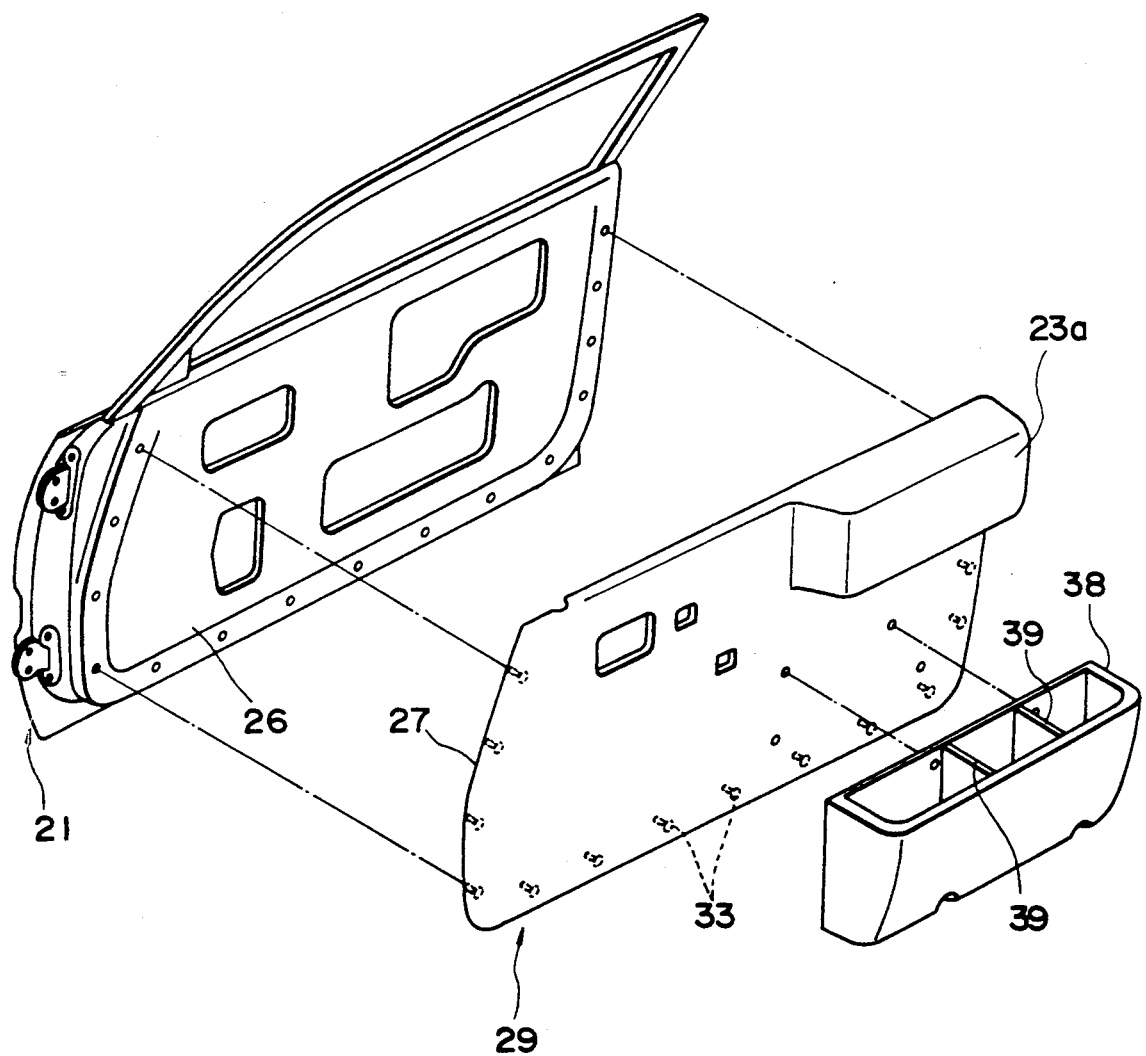
FIG. 15 is an exploded perspective view of assistance in explaining a manner of attaching an interior finishing unit provided with an impact energy absorbing structure of a seventh embodiment according to the present invention to a door inner panel.

An impact energy absorbing structure of a sixth embodiment according to the present invention shown in FIG. 15 employs the hard member 34 employed in the first embodiment instead of the hard member 37 employed in the fifth embodiment. The vertical side surface 23c of a lumbar region protecting shock absorbing pad 23b facing the interior of the passenger compartment is provided with a hard member 34 having a shape substantially resembling a cup. The upper and lower edges of the hard member 34 are rounded slightly. A chest protecting shock absorbing pad 32a is not provided with any such hard member. Thus, the rigidity of the lumbar region protecting shock absorbing pad 23b is greater than that of the chest protecting shock absorbing pad 23a.

Figure 16:
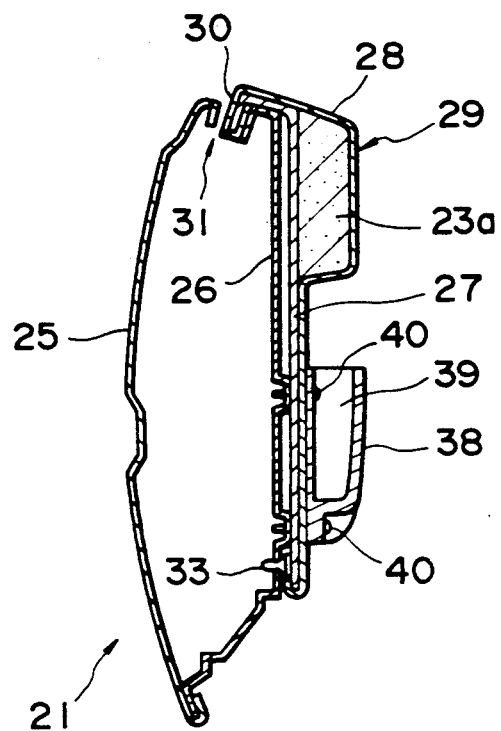
FIG. 16 is a sectional view of the impact energy absorbing structure shown in FIG. 15.

Seventh Embodiment (FIGS. 15 and 16)

An impact energy absorbing structure of a seventh embodiment according to the present invention shown in FIGS. 15 and 16 employs a chest protecting shock absorbing pad 23a similar to those employed in the foregoing embodiments, and a lumbar region protecting shock absorbing member 38 different in construction from the lumbar region protecting shock absorbing pads 23b employed in the foregoing embodiments. The lumbar region protecting shock absorbing member 38 serves as a door pocket as well as a shock absorbing member for the effective utilization of the space in the passenger compartment.

The chest protecting shock absorbing pad 23a is attached to a molded board or panel 27 and is coated with a vinyl leather sheet 28. A trim board or panel 29 provided with the chest protecting shock absorbing pad 23a is attached to the door inner panel 26 of a side door 21. The lumbar region protecting shock absorbing member 38 is a comparatively rigid, hollow member having an open upper end and a space divided by a plurality of partition walls 39. The lumbar region protecting shock absorbing member 38 is disposed on the trim board or panel 29 within the passenger compartment under the chest protecting shock absorbing pad 23a and is fastened to the door inner panel 26 of the side door 21 or to the trim board or panel 29 by screws 40. The lumbar region protecting shock absorbing member 38 is formed to have an appropriate rigidity by properly determining its wall thickness and the number of the partition walls 39.

Thus, the chest protecting shock absorbing pad 23a is formed of a rigidity appropriate for the passenger's chest, and the lumbar region protecting shock absorbing member 38 is formed of a rigidity greater than that of the chest protecting shock absorbing pad 23a and appropriate for the passenger's lumbar region, so that the impact energy absorbing structure is able to reduce the effect of a lateral collision on the passenger.

Figure 17:
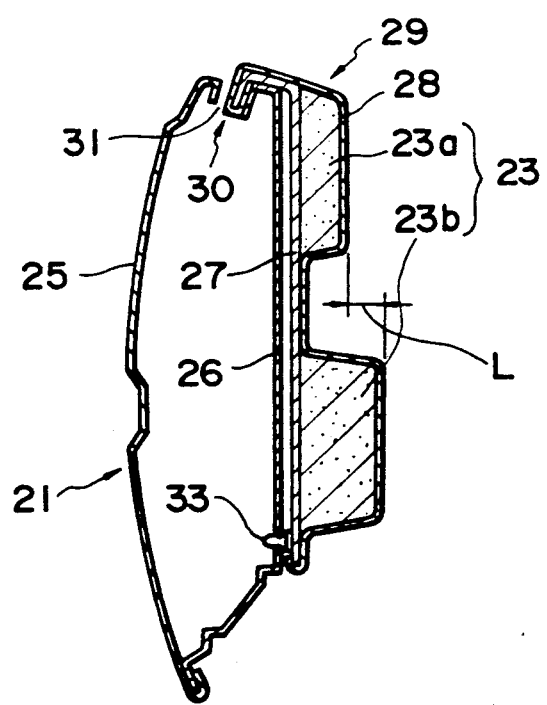
FIG. 17 is a sectional view of an impact energy absorbing structure of an eighth embodiment according to the present invention.
Figure 18:
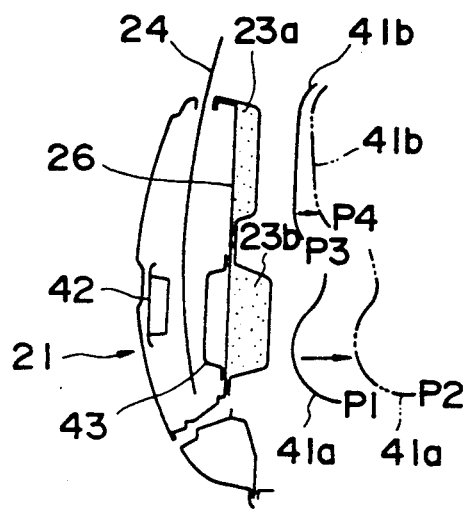
FIG. 18 is a diagrammatic view of assistance in explaining the respective speeds of the passenger's chest and lumbar region upon collision thereof against respective corresponding shock absorbing pads.

Eighth Embodiment (FIGS. 17 and 18)

An impact energy absorbing structure of an eighth embodiment according to the present invention shown in FIG. 17 employs a shock absorbing unit 23 basically similar in construction to that shown in any of FIGS. 6 to 16. As Shown in FIG. 17, the shock absorbing unit 23, comprises a chest protecting shock absorbing pad 23a and a lumbar region protecting shock absorbing pad 23b. The shock absorbing unit 23 is held on a trim board or panel 29 attached to the door inner panel 26 of a side door 21. The height or distance or the lumbar region protecting shock absorbing pad 23b from the trim board or panel 29 is greater than that of the chest protecting shock absorbing pad 23a from the trim board or panel 29, so that the passenger's chest collides at a colliding speed against the chest protecting shock absorbing pad 23a lower than the colliding speed of the passenger's lumbar region against the lumbar region protecting shock absorbing pad 23b. Concretely, the thickness, namely, the size with respect to the width of the vehicle, of the lumbar region protecting shock absorbing pad 23b is greater than that of the chest protecting shock absorbing pad 23a by a difference L as shown in FIG. 17.

When the shock absorbing unit 23 is thus constructed, the passenger's chest comes into collision with the chest protecting shock absorbing pad 23a at a delayed timing after collision of the passenger's lumbar region against the lumbar region protecting shock absorbing pad 23b. Such a difference in the timing of collisions between the passenger's chest and lumbar region has the following effect on the speed of collision.

Referring to FIG. 18, first, the lumbar region protecting shock absorbing pad 23b collides against the passenger's lumbar region 41a to force the passenger's lumbar region 41a to move toward the interior of the passenger compartment from a position P1 to a position P2. Then, the chest protecting shock absorbing pad 23a collides against the passenger's chest 41b as the passenger's chest 41b is moving toward the interior of the passenger compartment from a position P3 to a position P4 together with the passenger's lumbar region 41a. Since the chest protecting shock absorbing pad 23a must catch up with the passenger's chest 41b moving toward the interior of the compartment to collide against the passenger's chest 41b, the speed of collision of the passenger's chest 41b with the chest protecting shock absorbing pad 23a is lower than that that of the passenger's lumbar region 41a by the speed of movement of the passenger's chest 41b.

An impact bar 42 is disposed at a position corresponding to the lumbar region protecting shock absorbing pad 23b and a reinforcing member 43 is provided on the door inner panel 26 to enhance the rigidity of a portion of the side door 21 corresponding to the lumbar region 41a, which further enhances the foregoing effect of the impact energy absorbing structure.

The chest protecting shock absorbing pad 23a having a comparatively small thickness and projecting only relatively slightly from the door inner panel 26 provides a relatively wide space in the passenger compartment and facilitates entry into and exit from the vehicle.

Figure 19:
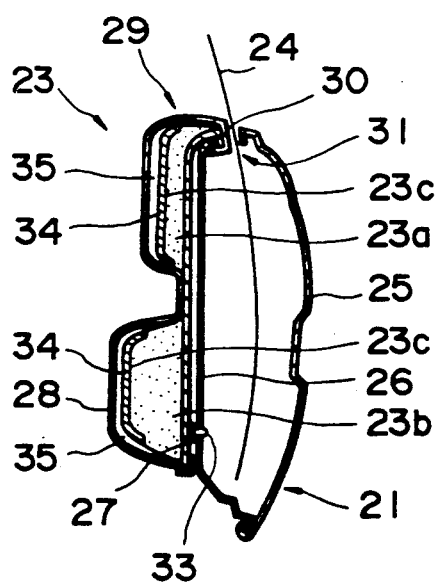
FIG. 19 is a sectional view of an impact energy absorbing structure of a ninth embodiment according to the present invention.

Ninth Embodiment (FIG. 19)

An impact energy absorbing structure of a ninth embodiment according to the present invention shown in FIG. 19 is embodied by incorporating the construction of the eighth embodiment into the impact energy absorbing structure of the first embodiment.

Referring to FIG. 19, the vertical side surfaces 23c of shock absorbing pads 23a and 23b facing the interior of the passenger compartment are covered with hard members 34 each having a shape substantially resembling a cup, the shock absorbing pads 23a and 23b and the hard members 34 are covered with a sponge layer 35, and the sponge layer 35 is covered with a vinyl leather sheet 28. The shock absorbing pads 23a and 23b, similar to those of the eighth embodiment, differ in thickness from each other, that is, the height of the chest protecting shock absorbing pad 23a from the door inner panel 26 is less than that of the lumbar region protecting shock absorbing pad 23b.

Thus, the speed of collision of the passenger's chest against the chest protecting shock absorbing pad 23a is less than that of the passenger's lumbar region against the lumbar region protecting shock absorbing pad 23b. The soft, elastic sponge layer 35 further mitigates shocks being imparted to the driver.

Thus, the effect of a lateral collision on the passenger's chest can be reduced, and the chest protecting shock absorbing pad 23a having a comparatively small thickness and projecting only slightly from the door inner panel 26 provides a wide space in the passenger compartment and facilitates access to the vehicle.

Although the foregoing embodiments employ the shock absorbing unit comprising the chest protecting shock absorbing pad 23a and the lumbar region protecting shock absorbing pad 23b, which are formed individually, the shock absorbing unit may comprise an integral shock absorbing pad having the functions of both the chest protecting shock absorbing pad 23a and the lumbar region protecting shock absorbing pad 23b.

Although the invention has been described as applied to the front side door 21 on the side of the passenger's seat, naturally, the present invention is applicable to any one of the side doors of a vehicle, i.e. the driver side front door and the rear side doors.

What is claimed is:

1. An impact energy absorbing structure comprising an impact energy absorbing means to be attached to a side wall of a passenger compartment of a vehicle to absorb impact energy resulting from a lateral collision and tending to act laterally on an occupant, said impact energy absorbing means comprising:
   shock absorbing pads to project from the side wall into the passenger compartment and having a relative softness sufficient to cushion impact energy action on the occupant; and
   rigidity enhancing means, covering said shock absorbing pads entirely and having a rigidity greater than that of said shock absorbing pads, for enhancing the relative rigidity of side surfaces that are to face the interior of the passenger compartment only of said shock absorbing pads sufficiently to prevent said shock absorbing pads from being damaged by a relatively slight impact force thereto while ensuring deformation of said shock absorbing pads upon application thereto of a relatively large impact force, said rigidity enhancing means having side walls covering side surfaces of said shock absorbing pads to face the interior of the passenger compartment having a thickness greater than that of circumferential walls of said rigidity enhancing means covering circumferential surfaces of said shock absorbing pads.

2. An impact energy absorbing structure according to claim 1, wherein said shock absorbing pads are formed of polyurethane.

3. An impact energy absorbing structure according to claim 1 wherein said circumferential walls of said rigidity enhancing means extend from said surfaces in a direction to be toward the side wall of the passenger compartment so as to cover said circumferential surfaces of said shock absorbing pads, and the thickness of said circumferential walls of said rigidity enhancing means decreases gradually from portions thereof near said side walls to edges thereof to be adjacent the side wall of the passenger compartment.

4. An impact energy absorbing structure according to claim 3, wherein said circumferential walls of said rigidity enhancing means covering said circumferential surfaces of said shock absorbing pads extend in directions to be inclined to the side wall of the passenger compartment.

5. An impact energy absorbing structure according to claim 1, wherein said rigidity enhancing means is a molded hard member formed of a synthetic resin.

6. An impact energy absorbing structure according to claim 1, wherein an outer surface of said rigidity enhancing means is coated with a soft elastic material.

7. An impact energy absorbing structure for a vehicle according to claim 6, wherein said soft, elastic material is sponge.

8. An impact energy absorbing structure according to claim 1, wherein said impact energy absorbing means comprises a chest protecting shock absorbing unit to be attached to the side wall of the passenger compartment at a position corresponding to an occupant's chest, and a lumbar region protecting shock absorbing unit to be attached to the side wall of the passenger compartment at a position corresponding to an occupant's lumbar region.

9. An impact energy absorbing structure according to claim 8, wherein said chest protecting shock absorbing unit is disposed above said lumbar region protecting shock absorbing unit, and said chest protecting shock absorbing unit and said lumbar region protecting shock absorbing unit are spaced apart from each other.

10. An impact energy absorbing structure according to claim 8, wherein the rigidity of said lumbar region protecting shock absorbing unit is greater than that of said chest protecting shock absorbing unit.

11. An impact energy absorbing structure according to claim 10, wherein the quality and composition of said shock absorbing pad of said lumbar region protecting shock absorbing unit is different from that of said chest protecting shock absorbing unit.

12. In impact energy absorbing structure according to claim 10, wherein said impact energy absorbing means further includes collision speed reducing means for ensuring that, in the event of a collision, the speed of collision of the occupant's chest against said chest protecting shock absorbing unit will be less than that of the occupant's lumbar region against said lumbar protecting shock absorbing unit.

13. An impact energy absorbing structure according to claim 12, wherein said collision speed reducing means comprises means for causing said lumbar region protecting shock absorbing unit to collide against the occupant's lumbar region before said chest protecting shock absorbing unit collides against the occupant's chest.

14. An impact energy absorbing structure according to claim 13, wherein the height or distance by which said lumbar region protecting shock absorbing unit is to protrude from the side wall of the passenger compartment is greater than that of said chest protecting shock absorbing unit.

15. An impact energy absorbing structure according to claim 14, wherein the thickness of said shock absorbing pad of said lumbar region protecting shock absorbing unit is greater than that of said shock absorbing pad of said chest protecting shock absorbing unit.

16. An impact energy absorbing structure according to claim 12, wherein said circumferential walls of said rigidity enhancing means extend from said side surfaces of said shock absorbing pads in a direction to be toward the side wall of the passenger compartment so as to cover said circumferential surfaces of said shock absorbing pads, and the thickness of said circumferential walls of said rigidity enhancing means decreases gradually from portions thereof near said side walls to edges thereof to be adjacent the side wall of the passenger compartment.

17. An impact energy absorbing structure according to claim 16, wherein said circumferential walls of said rigidity enhancing means covering said circumferential surfaces of said shock absorbing pads extend in directions to be included to the side wall of the passenger compartment.

18. An impact energy absorbing structure according to claim 12, further comprising a reinforcing member to be attached to the side wall of the passenger compartment at a position corresponding to said lumbar region protecting shock absorbing unit.

19. An impact energy absorbing structure according to claim 18, wherein said reinforcing member comprises a bar.

20. An impact energy absorbing structure according to claim 8, wherein said impact energy absorbing means further includes collision speed reducing means for ensuring that, in the event of a collision, the speed of collision of the occupant's chest against said chest protecting shock absorbing unit will be less than that of the occupant's lumbar region against said lumbar region protecting shock absorbing unit.

21. An impact energy absorbing structure according to claim 20, wherein said collision speed reducing means comprises means for causing said lumbar region protecting shock absorbing unit to collide against the occupant's lumbar region before said chest protecting shock absorbing unit collides against the occupant's chest.

22. An impact energy absorbing structure according to claim 21, wherein the height or distance by which said lumbar region protecting shock absorbing unit is to protrude from the side wall of the passenger compartment is greater than that of said chest protecting shock absorbing unit.

23. An impact energy absorbing structure according to claim 22, wherein the thickness of said shock absorbing pad of said lumbar region protecting shock absorbing unit is greater than that of said shock absorbing pad of said chest protecting shock absorbing unit.

24. An impact energy absorbing structure according to claim 20, wherein said circumferential walls of said rigidity enhancing means extend from said side surfaces of said shock absorbing pads in a direction to be toward the side wall of the passenger compartment so as to cover said circumferential surfaces of said shock absorbing pads, and the thickness of said circumferential walls of said rigidity enhancing means decreases gradually from portions thereof near said side walls to edges thereof to be adjacent the side wall of the passenger compartment.

25. An impact energy absorbing structure according to claim 24, wherein said circumferential walls of said rigidity enhancing means covering said circumferential surfaces of said shock absorbing pads extend in directions to be inclined to the side wall of the passenger compartment.

26. An impact energy absorbing structure according to claim 20, further comprising a reinforcing member to be attached to the side wall of the passenger compartment at a position corresponding to said lumbar region protecting shock absorbing unit.

27. An impact energy absorbing structure according to claim 26, wherein said reinforcing member comprises a bar.

28. An impact energy absorbing structure according to claim 1, further comprising a door inner panel of the vehicle forming the side wall of the passenger compartment.

29. An impact energy absorbing structure according to claim 28 wherein said impact energy absorbing means is incorporated into a trim unit attached to said door inner panel, said trim unit comprises a panel supporting said impact energy absorbing means and covering an inner surface of said door inner panel, and a covering member covering said panel and said impact energy absorbing means, and said trim unit is attached to said door inner panel to dispose said impact energy absorbing means in the passenger compartment.

30. An impact energy absorbing structure according to claim 1, wherein said rigidity enhancing means has a smooth surface.

* * * * *